United States Patent [19]

Galasan et al.

[11] 4,317,415
[45] Mar. 2, 1982

[54] RAILWAY CAR END DOORS

[75] Inventors: Felixberto A. Galasan, Chula Vista; Thomas H. Watson, Bonita; Robert L. Barkhimer, Chula Vista, all of Calif.

[73] Assignee: Pullman Incorporated, Chicago, Ill.

[21] Appl. No.: 111,562

[22] Filed: Jan. 14, 1980

[51] Int. Cl.³ .......................... B60J 5/10; B61D 3/02; B61D 17/06; B61D 19/00
[52] U.S. Cl. ..................................... 105/378; 49/163; 105/410; 160/200; 292/61; 410/26
[58] Field of Search ................ 49/40, 41, 44, 45, 163, 49/177, 233; 105/378, 410; 160/184, 200, 205, 210, 213, 328; 292/61, 62; 410/26, 67

[56] References Cited

U.S. PATENT DOCUMENTS

| 3,854,425 | 12/1974 | Allen | 105/378 X |
| 3,911,831 | 10/1975 | Blunden | 105/378 |
| 3,938,446 | 2/1976 | Seitz et al. | 105/378 X |
| 3,995,563 | 12/1976 | Blunden | 105/378 |
| 3,996,860 | 12/1976 | Ravani et al. | 105/378 X |
| 4,084,516 | 4/1978 | Ravani et al. | 105/378 X |
| 4,164,189 | 8/1979 | Fritz et al. | 105/378 |

FOREIGN PATENT DOCUMENTS 352329 7/1931 United Kingdom ............... 160/210

Primary Examiner—Robert R. Song
Assistant Examiner—Howard Beltran
Attorney, Agent, or Firm—Paul A. Kerstein

[57] ABSTRACT

An auto railway car having a plurality of decks is provided with a pair of folding door structures for closing the loading end of the car. The doors are hinged on spherical bearing structures and include locking mechanisms for locking the doors in open or closed positions.

9 Claims, 11 Drawing Figures

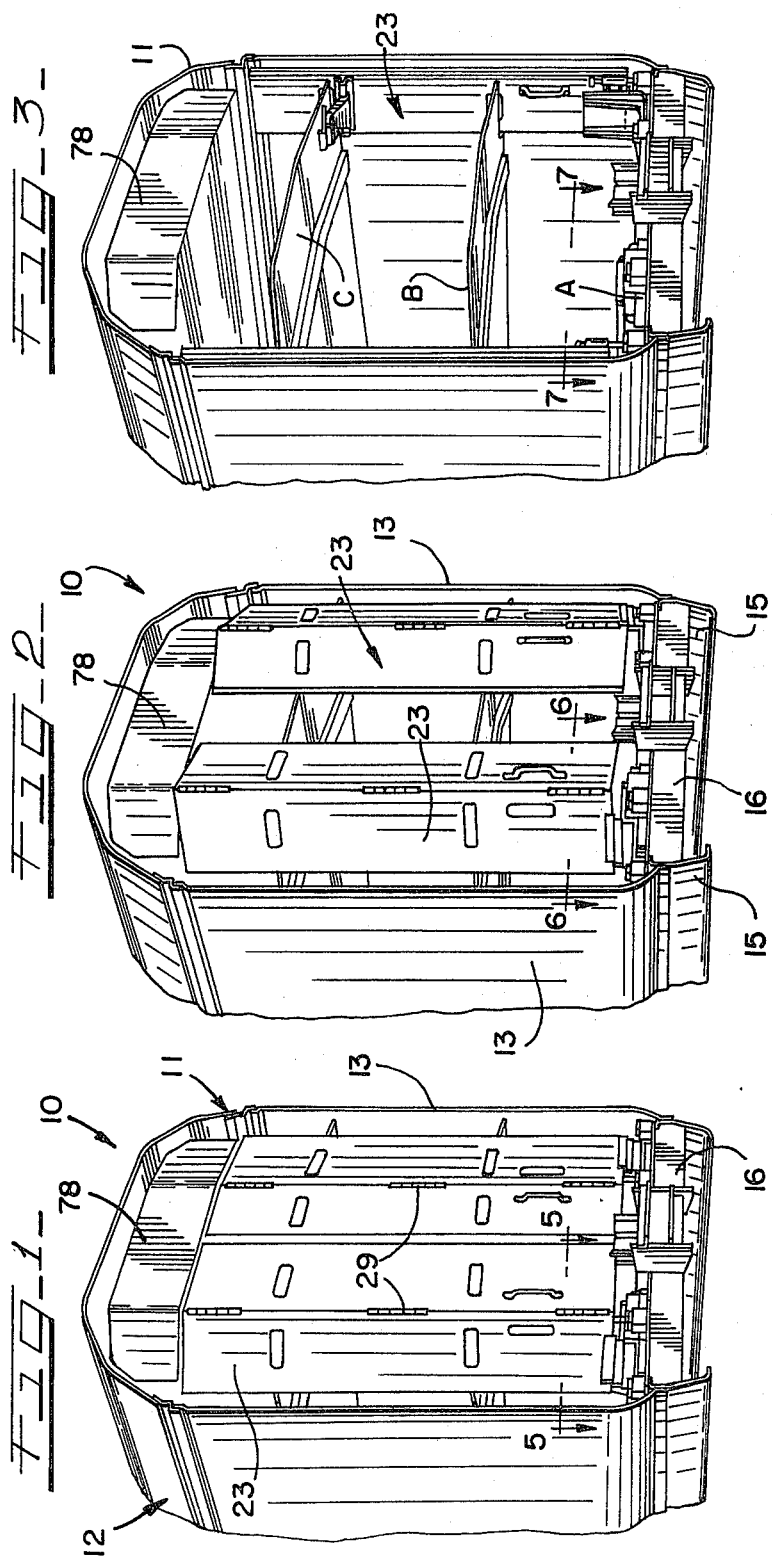

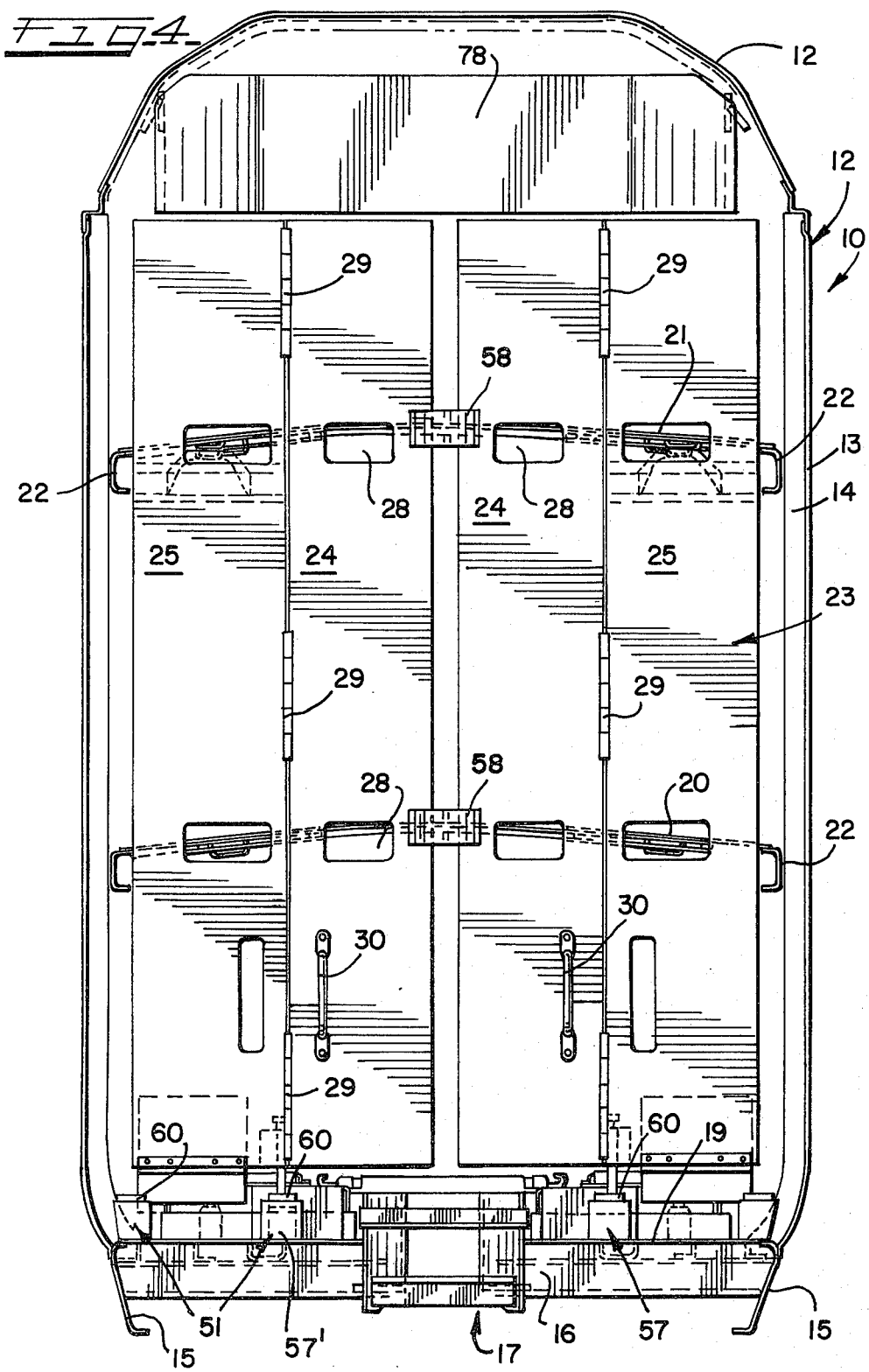

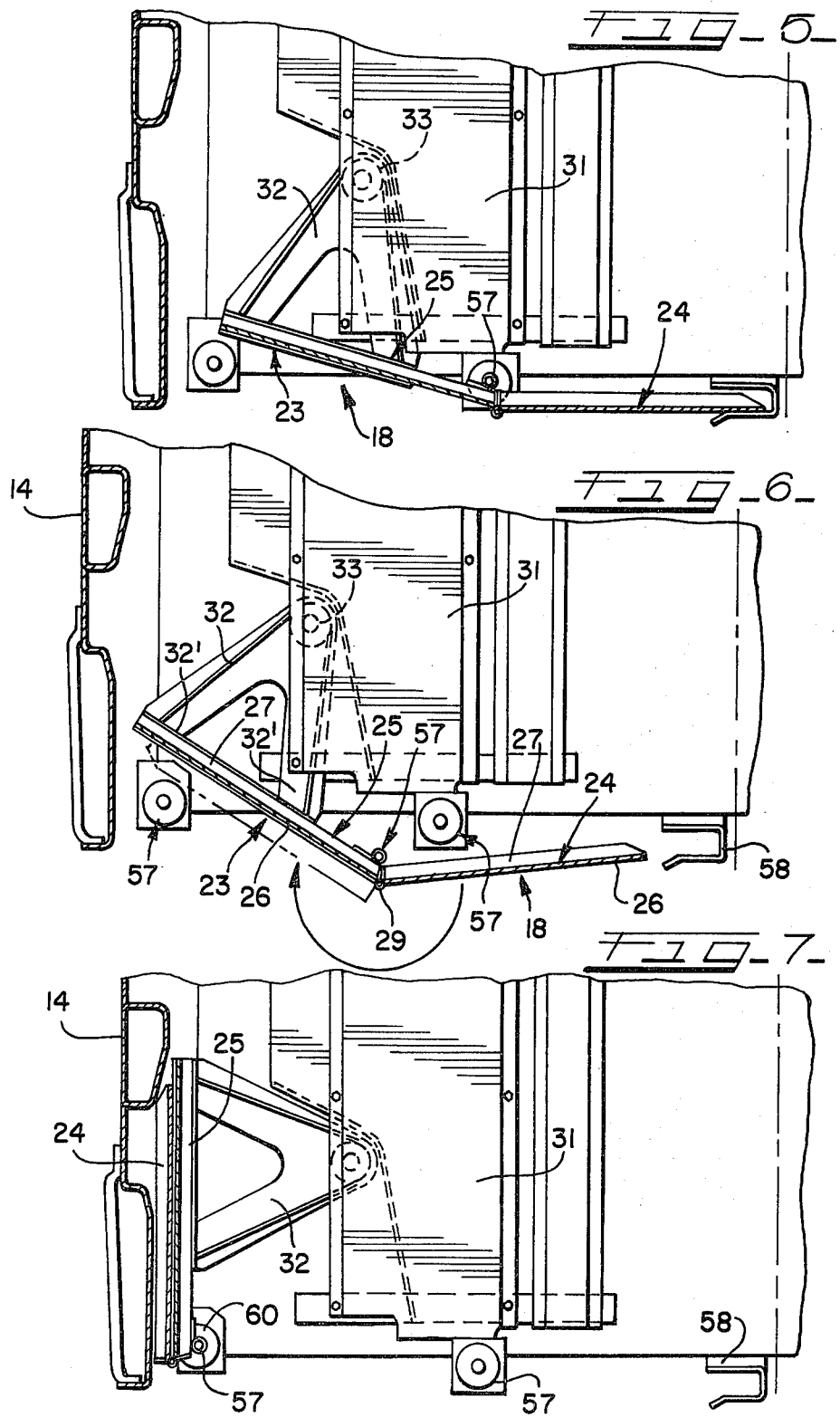

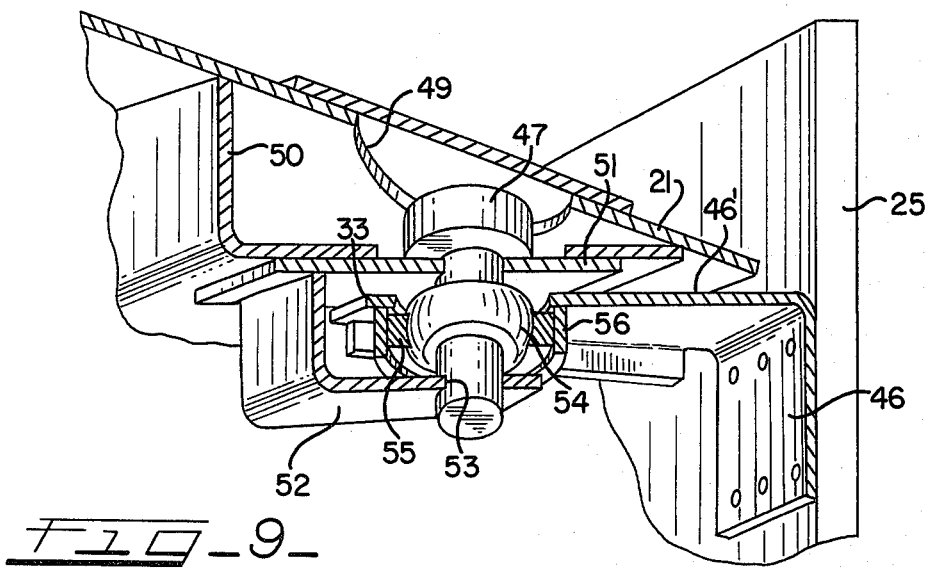
FIG-9-
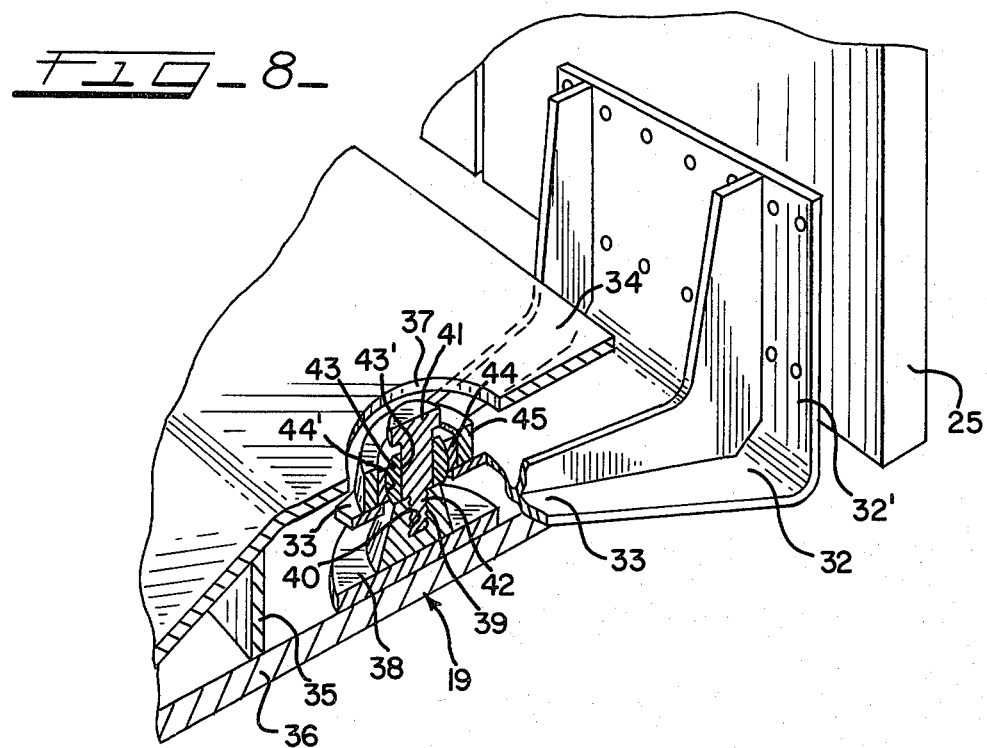
FIG-8-

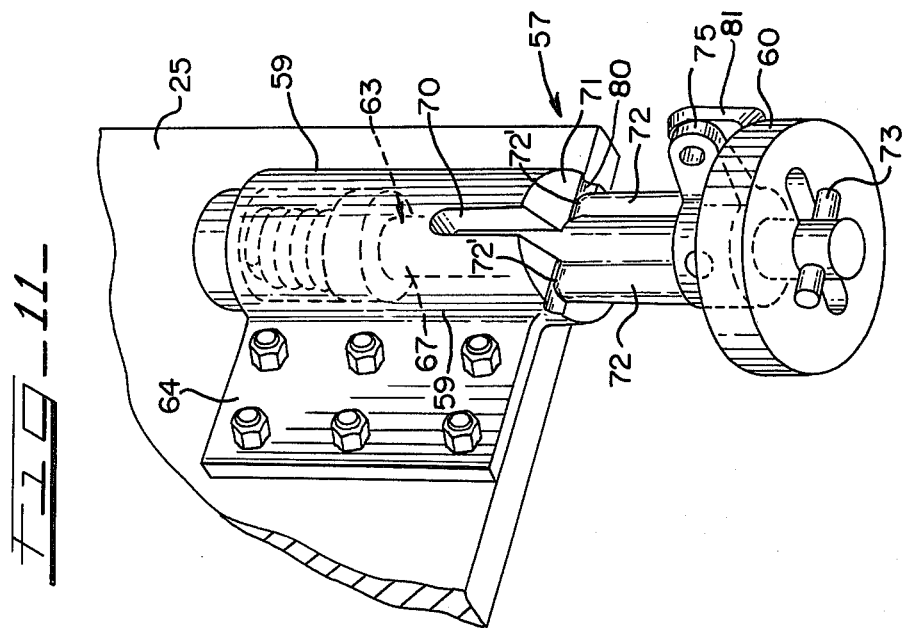
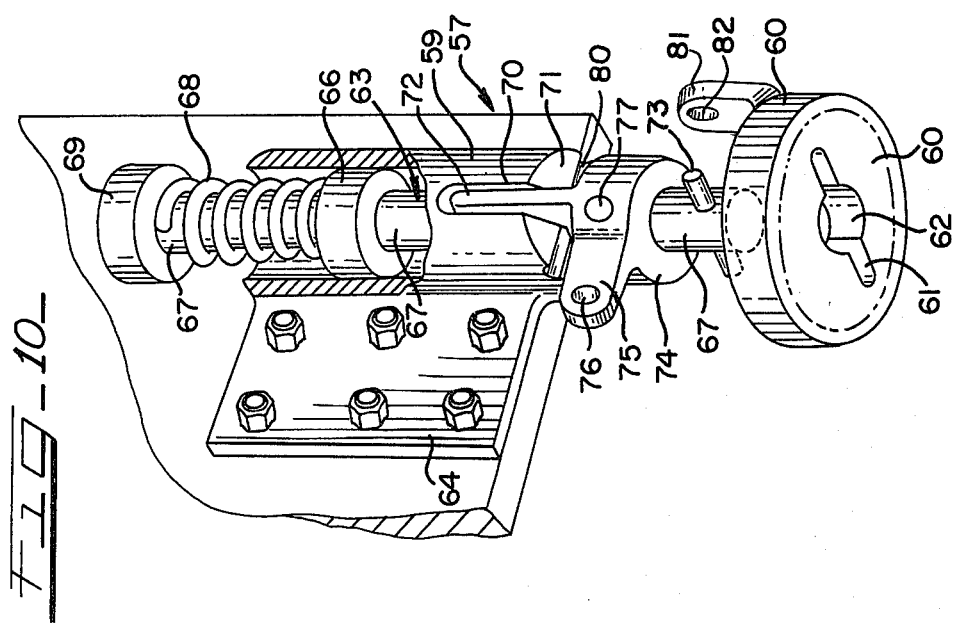

RAILWAY CAR END DOORS

The present patent application is related to Application Ser. No. 111,561 filed Jan. 14, 1980.

BACKGROUND OF THE INVENTION

1. Field of the Invention

The field of invention relates to auto rack type railway cars and more specifically pertains to a folding door structure provided at the end of the car, which end is utilized for the loading and unloading of automobiles.

2. Description of the Prior Art

U.S. Pat. No. 3,911,831 discloses foldable doors provided at the end closure of a rail car carrying automobiles.

In this particular arrangement outer folding doors are connected on a vertical hinge which is provided at the extreme ends of the car. The folding door arrangement is also shown in U.S. Pat. No. 3,996,860 and in this case the panels are folded and swung outwardly to the sides or rear ends of the car where they are stored in the open position.

Another patent disclosing a hinge arrangement for folding doors is U.S. Pat. No. 4,084,516, Apr. 18, 1978, this patent also showing a vertical pivot folding door arrangement mounted at the extreme ends of the railway car. The hinge arrangement is entirely different from the present invention wherein the vertical hinge point is spaced considerably inwardly from the end of the car and also spaced considerably laterally of the side wall of the car. A hinge arrangement, similar to the above patents is disclosed in U.S. Pat. No. 3,938,446, Feb. 17, 1976, which discloses the hinge point at the extreme ends of the car and against the side wall thereof with a rack and pinion movement provided for the folding doors to place them in a flush closed position. U.S. Pat. No. 3,854,425, Dec. 17, 1974, discloses individual door sections for each of the deck arrangements and again a conventional hinging action for the folding doors is achieved at the end of the car and almost in line with the side wall of the car. In the present improved invention an entirely different hinging action is achieved by placing the hinge point at a certain position and including a novel spherical bearing arrangement. Further the present invention is an improvement over the aforementioned patents and discloses a novel locking mechanism for locking the doors in either open or closed position.

SUMMARY OF THE INVENTION

The present invention of an improved autocarrying railway car includes two pairs of folding doors which are supported at the loading end of the car for relative folding and hinging movement from a closed to an open position. In the present arrangement the folding doors include inner and outer panels with the inner panel being folded initially inwardly and then outwardly over the end of the outer panel and whereupon the two folded panels are pivoted into a recessed position substantially parallel with the ends of the side walls of the car. In the novel arrangement disclosed the hinges are constructed in the form of V-shaped brackets having at the apex of each bracket a pivot bearing of spherical construction. Upper and lower brackets are provided and the apex hinging point is disposed substantially inwardly of the end of the car and also substantially laterally from the side wall of the car whereupon the doors are completely recessed within the ends of the car in the open position and are readily swung outwardly back to a closed position. The spherical bearing arrangement provides for accurate alignment of the doors and ease in closing and opening of the same. Further the arrangement also includes a novel door locking mechanism wherein the doors may be locked either in the open or closed position by means of a latching element which includes a keeper engaging end adapted to be placed in indexing engagement with a lock plate one of which is provided for maintaining each of the pairs of doors in either an open or in a closed position.

BRIEF DESCRIPTION OF THE DRAWINGS

FIG. 1 is a perspective view of one end of a railway car for transporting autos showing a folding door arrangement in a closed position;

FIG. 2 is a similar view to FIG. 1 showing the partial opening of the folding door arrangement;

FIG. 3 is a view showing the end of a railway car with doors in an open and stored position;

FIG. 4 is a rear elevational view of a door arrangement and end of car similar to FIG. 1;

FIG. 5 is a cross-sectional view taken along the line 5—5 of FIG. 1;

FIG. 6 is a cross-sectional view taken along the line 6—6 of FIG. 2;

FIG. 7 is a cross-sectional view taken along the line 7—7 of FIG. 3;

FIG. 8 is a perspective view of a lower hinge structure for a folding door arrangement;

FIG. 9 is a perspective view of the upper hinge structure for a folding door arrangement;

FIG. 10 is a perspective view of a locking arrangement for holding the doors in a locked position, either open or closed;

FIG. 11 is a view disclosing the locking arrangement in locked relation with respect to a keeper mechanism.

DESCRIPTION OF THE PREFERRED EMBODIMENT

As best shown in FIGS. 1–4 a railway car 10 comprises a car body 11 including a roof structure 12 supported on side walls 13. The present railway car is of a type which is designed especially for the transport of automobiles and the side walls 13 include upright supports 14 which are supported on longitudinally extending laterally spaced side sills 15. The side sills 15 are connected by means of cross bearers 16 which are longitudinally spaced along the length of the car. The present car includes the conventional center sill and underframe structure 17 which is only disclosed generally the same being conventional in the field of railway cars. A loading end 18 is provided at one end of the car though both ends of the car may be identical and suitably constructed for the loading and unloading of the automobiles. The car is provided with a lower A-deck 19, a B-deck 20 which is intermediately disposed and an upper C-deck 21. The decks are conventionally supported on longitudinally extending stringers 22 in turn supported from the side walls 13 of the car.

As best shown in FIGS. 1–4 a door structure is designated at 23 and each end includes two pairs, each pair including an inner door panel 24 and an outer door panel 25. Each of the doors includes vertical metal sheathing 26 and suitable vertically spaced and transversely extending lateral reinforcements 27. The doors are provided with a plurality of openings 28 providing for clearance to the railway car 'B' and 'C' deck bridge plate supports (not shown). The inner door panels 24 and outer door panels 25 are connected for hinging movement by means of a plurality of vertically spaced hinge members 29. A handle 30 is connected to each of the panels 24. The car is provided with conventional guideways or ramps 31 on which the automobiles to be transported are loaded.

As best shown in FIGS. 5, 6 and 7 lower hinge brackets 32 include V-shaped rear hinge end portions 33 provided at the apex of each bracket. The hinge brackets have the other forward ends 32' rigidly connected to the inner edges of the door panels 25. As best shown in FIG. 8 the ramps 31 also each include a raised longitudinally extending ramp portion 34. Longitudinally extending vertical supports 35 support the raised portions 34 from and upon the A-deck 19 which is a metal floor panel designated at 36. The hinge structure also is best indicated and shown in FIG. 8 and the raised ramp portion 34 is provided with an aperture or access opening 37. A lower hinge bearing arrangement includes a connector plate 38 suitably rigidly connected to the upper surface of the metal floor panel 36. The connector plate 38 has connected thereto a vertically extending post 39 having a vertical open end threaded bore 40. A connector pin 41 includes a lower threaded portion 42 which is threaded into the threaded bore 40. A spherical bearing part 43 includes a bore 43' through which the pin 41 extends and rigidly connects the same to the post 39. A bearing member 44 includes an inner arcuate surface 44' which is supported on the spherical bearing 43 in bearing relation. The bearing member 44 is secured to the apex end 33 of the hinge bracket 32 by means of a sleeve 45 and thus provides for the lower swiveling or hinging movement of the said bracket.

FIG. 9 discloses the upper hinging arrangement for the folding doors. An upper hinge bracket 46 includes an upper flat plate 46' disposed in V-shaped configuration and being provided with an apex portion as designated at 33. The bracket 46 is suitably connected to the inner surfaces of the outer door panels 25 at the upper ends thereof. A bearing connector member 47 includes a downwardly projecting pin or post 48, the said connector member 47 having access thereto by means of an access opening 49. A rigid bracket structure 50 is connected to the underneath side of the deck 21 and includes a horizontally extending flat plate portion 51 suitably secured to the said deck 21. A clevis plate 52 is suitably connected to the plate 51 and is provided at its lower end with an opening 53. The post or pin 48 extends through the opening 53. A spherical bearing or bushing member 54 is fitted to the pin 48 and a concave bearing 55 is swiveled on the said spherical bearing member 54. The concave bearing 55 is connected to an outer ring 56 suitably rigidly supporting on the apex end 33 of the hinge bracket 46. The lower and upper bearings are of course in proper alignment and provide a precise end easily movable hinging action for the folding doors. They are both also vertically slidable on the posts 41 and 48.

Referring now to FIGS. 4 and 6 a locking arrangement is generally designated at 57. Two locking arrangements are provided for each of the pairs of swinging door panels, one which will lock the doors in the open recessed position and the other which will lock the door in the closed position. The specific details of the locking arrangement are best shown in FIGS. 10 and 11. FIG. 10 discloses the locking arrangement in the unlocked position whereas FIG. 11 shows the locking arrangement in the locked position. As best shown in FIGS. 4 through 7 the inner door panels are in the closed position seated in centrally located U-shaped door retainers 58 which provide for engagement with the inner ends of the inner doors. Each of the locking arrangements 57 includes a vertical tubular-shaped housing member 59. A keeper member designated at 60 is rigidly supported on a hollow or pipe-shaped support 57' rigidly connected and projecting upwardly with respect to the A-deck 19. Each keeper portion 60 includes a vertically extending indexing notch 61 having a central enlarged opening 62. The locking arrangement 57 further includes a latch member 63 vertically reciprocal within the tubular-shaped housing 59. The housing 59 includes a bracket 64 which rigidly connects the same to the innermost edge of the outer panels 25. As best shown in FIG. 10 which discloses a portion broken away at the upper end of the tubular housing 59 a collar 66 is rigidly supported within the housing. A plunger 67 is slidably supported within the housing 59 and extends through the collar 66 in sliding relation. The collar 66 may be formed as part of the tubular housing 59. The upper end of the plunger 67 has a head portion 69 connected thereto and a spring 68 is held captive between the collar 66 and head 69 for continually urging the plunger 67 to the position indicated in FIG. 10. The plunger 67 projects outwardly and downwardly from the tubular housing 59. A slot 70 is provided in the lower end of the housing 59 and the said housing has at its lower end a tapering cam surface 71. As best shown in FIGS. 10 and 11 the plunger 67 is provided with outwardly projecting cam wings 72 having at their upper ends cam follower portion 72'. In the locking position of the plunger 67, as shown in FIG. 11, the cam follower projections 72' are seated within the recess 80 to deter the plunger 67 from moving to an unlocked position. The lower end of the plunger 67 is provided with an indexing pin 73 which is adapted to move through the slots 61 to the locking position shown in FIG. 11. A collar 74 is supported on the lower end of the plunger 67 and is fixed thereto to rotate the plunger 67 as desired. The collar 74 includes an outwardly projecting finger 75 and is provided with an opening 76 which may be used to lock the collar against rotation. This is achieved by the lug 81 having opening 82 and being connected to keeper member 60. An opening 77 is provided in the collar 74 within which a suitable tool may be inserted for rotating collar 74.

The purpose of the cam surface 71 is to lift the door assembly as indicated. This, in effect, vertically unloads the lower pivot bearing, isolating it from potentially damaging forces. The lock is positioned essentially in line with the door assembly center of gravity providing the required vertical retention. When in an unlocked position, the weight of the doors is supported vertically by the lower bearing and laterally and longitudinally by both the upper and lower. This feature permits the acceptance of normal manufacturing tolerances without the necessity for "fitting" at assembly. Another benefit of the spherical bearing is their ability to isolate the doors from the normal racking and parallelogramming experienced with this type of structure. This is accomplished by the "self-aligning" design.

Operation

FIG. 1 discloses the doors in the closed position. It will be noted that an upper door 78 also closes the upper space provided at the upper ends of the folding doors. This door and its operation is more specifically described in the aforementioned referred-to patent application. In FIG. 2 the doors have been partially opened and in FIG. 3 the lower folding doors are in their completely opened and out-of-the-way position. FIGS. 5, 6 and 7 also show the sequence of opening of the doors. FIG. 5 shows the pair of folding doors in completely closed position. Upon disengagement of the latch member 57 from the keeper arrangement the doors can be moved into the position indicated in FIG. 6 which is slightly open and whereupon the inner door panel 24 is then swung in the direction of the arrow shown in FIG. 6, which is clockwise, to the position shown in dotted lines in FIG. 6 (against the door 25) whereupon the fully folded door arrangement now can be moved to the completely recessed position shown in FIG. 7. In this position the folded doors are completely out of the way and recessed within the open end of the car. FIG. 7 also shows the latch 57 in engagement with a keeper portion 60 and the operation of the locking arrangement will now be described.

The locking plunger 67 is normally in the position shown in FIG. 10 which is the unlocked position. In practice, of course, the doors are either locked in the recessed position open or are locked in the closed position closed. The spring 68 normally moves the plunger 67 to the position shown in FIG. 10 whereupon the cam wings 72 are recessed within the slots 70. To move the locking plunger 67 to the position shown in FIG. 11 the same is moved downwardly by means of the operator moving the collar 74 downwardly by inserting a suitable tool into opening 77. As he moves it downwardly against the force of the spring the indexing pin 73 is is alignment and moves through the slots 61 below the keeper portion 60 whereupon the collar is turned and the indexing pin 73 assumes the position shown in FIG. 11 firmly locking the plunger 67 against upward retraction. As this position is reached and the collar is turned, the upper cam follower surfaces 72' of the cam wing 72 engage the underneath side of the sloping cam 71 so that upon turning movement the tubular housing as well as the door itself has a tendency to move in a limited fashion upwardly whereupon the whole weight of the door is then on the keeper 60 and the indexing pin is firmly locked against opening movement whether the door is locked in the transit or loading position. The opening 76 may be suitably utilized for locking of the lock when it is desired to lock the doors completely such as while the cars are being stored or are in transit.

One of the major goals achieved by this design is ease in opening and subsequent closing. Some designs use tracks for guiding the units where a great amount of friction is generated making operation difficult. The spherical bearings have been employed for their low friction characteristics in addition to their ability to "self-align" minimizing friction causing misalignment.

What is claimed is:

1. In a railway car having a body including side walls and a roof structure
    said body having a loading end and lower and upper cargo supporting horizontal decks adapted to be loaded with cargo through said loading end the improvement comprising;
    a door arrangement including a pair of door structure ends including inner and outer vertical door panels
    first hinge means interconnecting said inner and outer door panels,
    second hinge means including lower and upper hinge brackets rigidly connected to said outer door panels,
    each said hinge bracket having a hinge end portion spaced a substantial distance inwardly from said outer door panels,
    pivot means for connecting each said hinge end portion to said upper and lower decks comprising spherical bearing members for providing universal movement, and
    said pivot means for connecting each said hinge end portion to said upper and lower decks located a substantial distance inwardly from an adjacent side wall and inwardly from the loading end of said body whereby said inner and outer vertical door panels may be folded together and rotated about said hinge ends to a position parallel to an adjacent side wall.

2. The door arrangement in accordance with claim 1, one inner panel being hingedly movable in clockwise direction against an outer surface of said outer panel, and said other inner panel being movable in counterclockwise direction.

3. The door arrangement in accordance with claim 1, including means locking said door structure in closed and open positions.

4. The door arrangement in accordance with claim 1, said upper hinge bracket being connected to said upper deck to project downwardly with respect thereto, and
    said lower hinge bracket being connected to said lower deck and projecting upwardly with respect thereto.

5. The door arrangement in accordance with claim 4, said upper and lower decks including hinge bracket supporting members,
    and said pivot means including cooperating spherical bearing members supported on said hinge bracket supporting members.

6. The door arrangement in accordance with claim 5, including locking means on said decks for locking said door in a closed and open position.

7. The door arrangement in accordance with claim 1, said pivot means for each said hinge end portion being spaced from said loading end and from said adjacent side wall substantially of equal distance.

8. The door arrangement in accordance with claim 7, said pivot means comprising spherical interengaging bearing members.

9. The door arrangement in accordance with claim 8, including a locking latch on each door structure,
    a keeper member adjacent said side wall on said lower deck,
    and a second keeper member on said lower deck spaced inwardly from said side wall and being substantially contiguous to a rearward end of said lower deck,
    said latch being adapted to engage each said keeper member to maintain said doors in closed and open positions.

* * * * *